United States Patent [19]
Tseng et al.

[11] Patent Number: 6,119,717
[45] Date of Patent: Sep. 19, 2000

[54] FLUID FLOW CONTROL APPARATUS

[75] Inventors: Ling-Hsin Tseng, Hsin-Chu Hsian; Junson Shu, Taipei Hsian; David Sheu, Hsin-Chu Hsian, all of Taiwan

[73] Assignee: United Microelectronics Corp., Hsin Chu, Taiwan

[21] Appl. No.: 09/235,164

[22] Filed: Jan. 22, 1999

[51] Int. Cl.[7] ................................................ G05D 11/03
[52] U.S. Cl. .................................... 137/341; 137/895
[58] Field of Search .................................. 137/892, 893, 137/894, 895, 340, 341

[56] References Cited

U.S. PATENT DOCUMENTS

| | | | |
|---|---|---|---|
| 1,305,632 | 6/1919 | Turner | 137/892 |
| 4,185,054 | 1/1980 | Nakamura et al. | 137/895 |
| 4,615,352 | 10/1986 | Gilbot | 137/892 |
| 5,133,498 | 7/1992 | Sealy et al. | 137/895 |
| 5,218,988 | 6/1993 | McNamara et al. | 137/895 |

FOREIGN PATENT DOCUMENTS

| | | | |
|---|---|---|---|
| 44-24030 | 6/1965 | Japan | 137/895 |

*Primary Examiner*—Stephen M. Hepperle
*Attorney, Agent, or Firm*—Bacon & Thomas, PLLC

[57] ABSTRACT

A fluid flow control apparatus precisely controls a slight flow of fluid being mixed with a carrier gas. The apparatus includes a container for containing the fluid and a conduit for conducting the fluid, one portion of the conduit having a smaller diameter than the other, the smaller diameter portion of the conduit Including a needle valve for controlling the flow of the carrier gas into the conduit. A fluid transmission line connected at one end to the conduit and at the other end to the container conducts fluid from the container into the conduit to be mixed with the carrier gas before the mixture is introduced into a reacting chamber.

27 Claims, 3 Drawing Sheets

FLUID FLOW CONTROL APPARATUS

BACKGROUND OF THE INVENTION

1. Field of the Invention

The present invention relates to fluid flow control apparatus, and more particularly, to fluid flow control apparatus, which can precisely control slight flow of the fluid.

2. Description of the Prior Art

Fluid flow control apparatus is commonly used in semiconductor manufacturing, in which fluid such as TetraEthOxySilane (TEOS), silane ($SiH_4$) in a deposition process, or acid HF in an etch process, is required to uniformly and controllably conducted into a reacting chamber.

The arrangement demonstrated in FIG. 1 is an apparatus used in the prior technique, in which gas is injected into the fluid 20 in the container 10 via an input tube 30 inserted into the fluid 20, finally being saturated in the fluid 20. The saturated gas leaving the fluid 20 is then collected by an output tube 32. The gas is further conducted to a mass flow control (MFC) unit 50, and eventually is output to a reacting chamber 80. The apparatus shown in FIG. 1 disadvantageously possesses unpreciseness and nonuniformity on the flow control, and can not be adapted to the control of slight flow of the fluid.

FIG. 2 shows another flow control apparatus in the prior technique. A tube 40 with small diameter is inserted into the fluid 22 contained in a container 10. The fluid 22 is transmitted to a fluid control unit 60, and is then output to a chamber 80. The fluid control unit 60 accompanying the specific tube 40 can greatly improve the uniformity of the flow and its speed. Unfortunately, the amount of the fluid provided by the shown arrangement is limited, and no gas bubble can be tolerated in the specific tube 40, therefore stringing the requirement of the operation for this apparatus. Further, the fluid control unit 60 generally costs much, and its setup requires a great deal of labor.

For the foregoing reasons, there is a need for a fluid flow control apparatus for precisely and uniformly controlling the fluid flow.

SUMMARY OF THE INVENTION

In accordance with the present invention, a fluid flow control apparatus is provided, which can precisely control slight fluid flow.

In one embodiment, the apparatus includes a conduit for conducting carrier gas and fluid, wherein one portion of the conduit has smaller diameter than other portion of the conduit. A mass flow control unit is used to regulate the carrier gas, and then to conduct the regulated carrier gas into the conduit. Also, a container is used for containing the fluid. Further, the apparatus includes a needle valve coupled to the portion with smaller diameter of the conduit for controlling flow speed of carrier gas therein; and also includes a fluid transmission line, whose one end is connected to the conduit, and the other end is coupled to the container, so that the fluid in the container is transmitted into the conduit to be mixed with the carrier gas.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
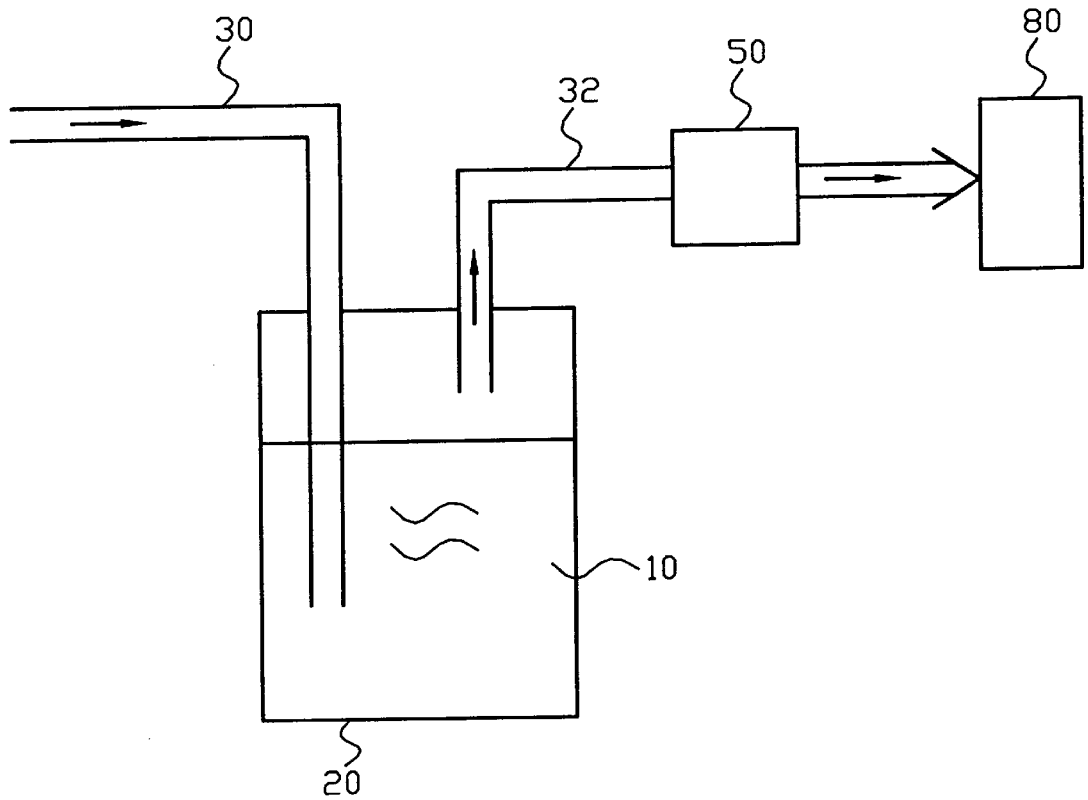
FIG. 1 shows the arrangement of a fluid flow control apparatus used in the prior technique.
Figure 2:
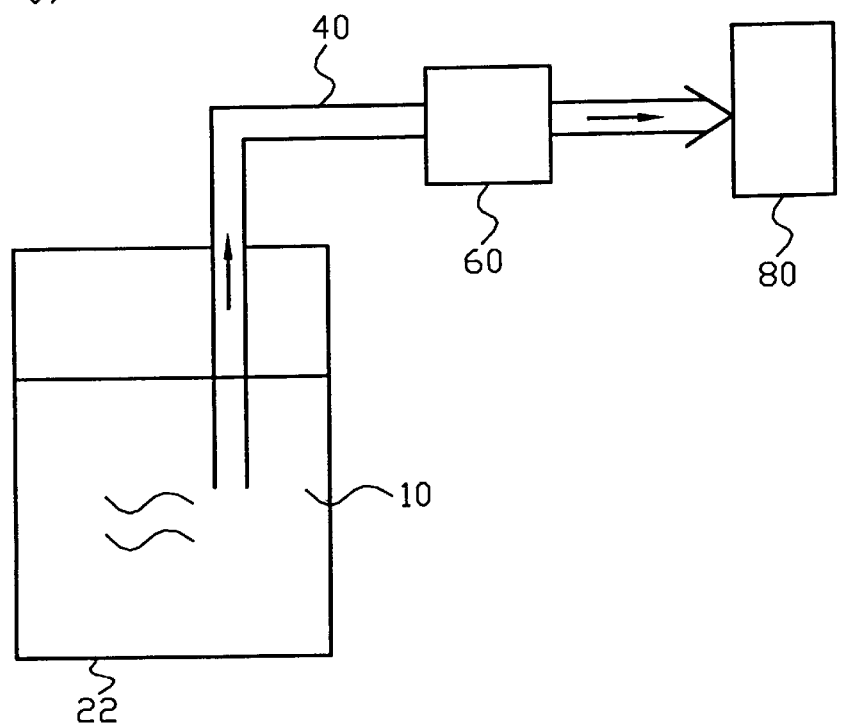
FIG. 2 shows the arrangement of another fluid flow control apparatus used in the prior technique.
Figure 3:
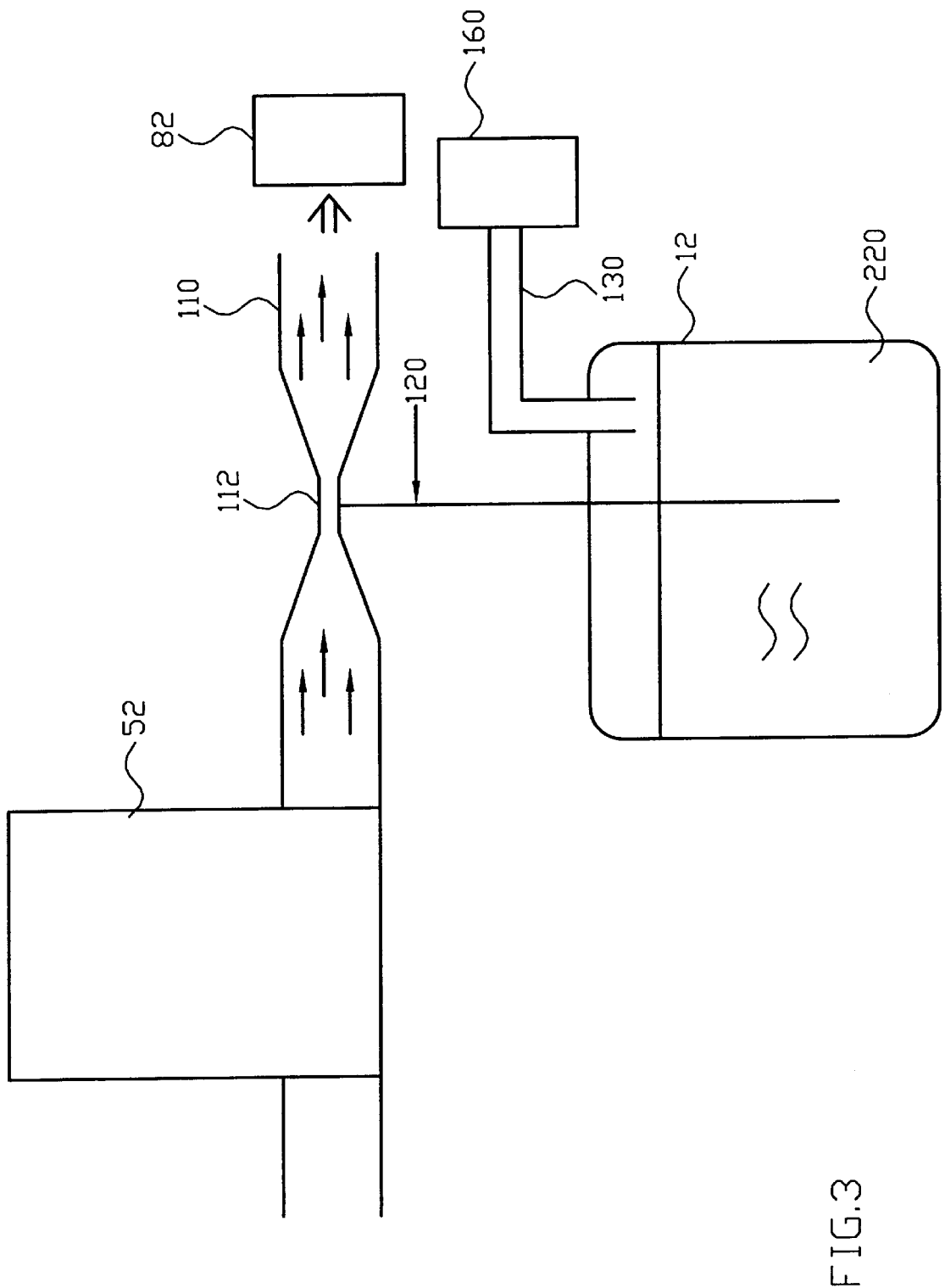
FIG. 3 shows a schematic diagram of the fluid flow control apparatus according to one embodiment of the present invention.

FIG. 3 shows a schematic diagram of the fluid flow control apparatus according to one embodiment of the present invention. A glass conduit 110 connects to a gas flow control unit 52, such as a mass flow control (MFC) unit, at one end, and connects to a chamber 82 at the other end. The conduit 110 has a portion 112 approximately in the middle of its passage with diameter as small as about 0.2 cm. Further, a fluid transmission line 120 connects to the conduit 110 near the portion 112 with small diameter at one end, and inserts into a container 12 at the other end, so that the fluid 220 in the container 12 is transmitted into the conduit 110 to be mixed with the carrier gas from the gas flow control unit 52. Moreover, the pressure in the container 12 is further regulated by a regulating unit 160 through a tube 130. In this embodiment, the carrier gas includes inert gas, such as gas nitrogen, which does not react with the fluid 220. The fluid includes TetraEthOxySilane (TEOS), silane ($SiH_4$) in a deposition process, or acid HF in an etch process. Also, the diameter of the fluid transmission line 120 is about 0.7 mm.

The carrier gas mentioned above is regulated by the mass flow control (MFC) unit 52, and is then injected into the conduit 110. According to Bernoulli phenomenon, the fluid 220 in the container 12 is attracted upward and is then mixed with the carrier gas. The mixed gas and fluid is subsequently conducted to the chamber 82. Alternatively, the fluid transmission line 120 is used as a capillary tube, and the fluid 220 in the container 12 is thus attracted upward according to capillary action. The regulating unit 160 is further used to regulate the pressure in the container 12, so that the flow speed of the fluid 220 in the fluid transmission line 120 can be further maintained.

Figure 4:
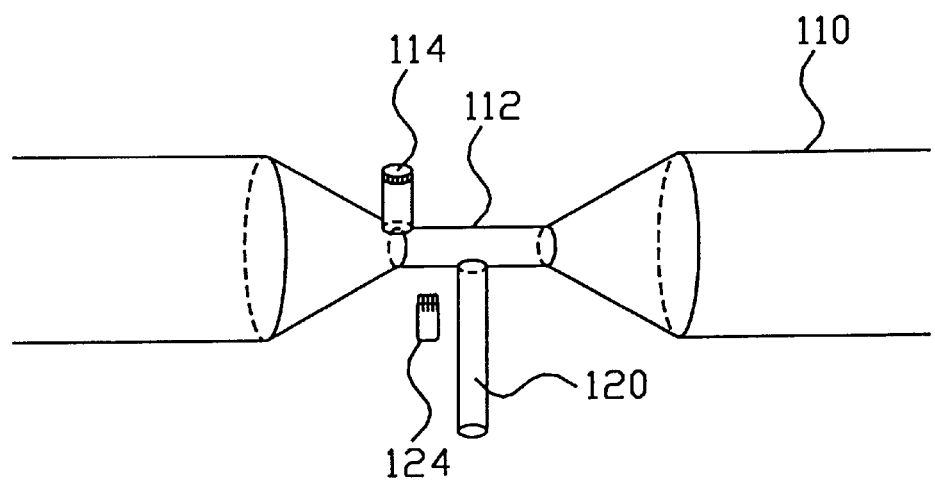
FIG. 4 shows a portion of the fluid flow control apparatus.

According to the embodiment of the present invention, a mixing unit such as a needle valve 114 is coupled to the conduit 110 near the portion 112 with small diameter, as shown in FIG. 4, so that the diameter of the conduit 110 can be controllably adjusted. A heater 124 is optionally coupled to the conduit 110 near the portion 112 with small diameter. Accordingly, the fluid 220 is thus vaporized by the heater 124, thereby increasing mixing uniformity of the gas and the fluid.

Figure 5:
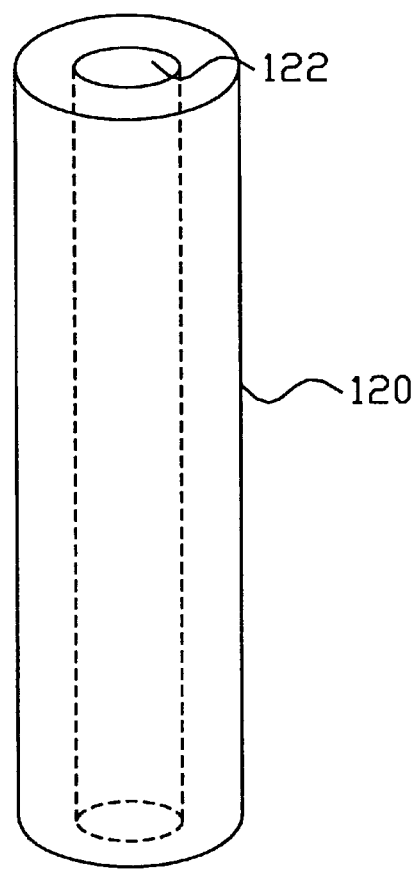
FIG. 5 shows a magnified view of the fluid transmission line according to the embodiment of the present invention.

Moreover, a candlewick 122 is optionally used inside the fluid transmission line 120 to increase the transmission efficiency of the capillary tube 120, as illustrated in the magnified diagram of FIG. 5.

Although specific embodiments have been illustrated and described, it will be obvious to those skilled in the art that various modifications may be made without departing from what is intended to be limited solely by the appended claims.

What is claimed is:

1. A fluid flow control apparatus, comprising:

a conduit for conducting carrier gas and fluid;

means for controlling flow of the carrier gas, an input end of said controlling means being configured to receive the carrier gas, and an output end of said controlling means being connected to one end of said conduit;

a container for containing the fluid;

mixing means, coupled to passage of said conduit, for mixing the carrier gas and the fluid;

a fluid transmission line, one end of said fluid transmission line being connected to said conduit, and the other end of said fluid transmission line being coupled to said container, so that the fluid in the container is transmitted into said conduit to be mixed with the carrier gas; and a regulating unit, coupled to said container, for regulating pressure in said container.

2. The fluid flow control apparatus according to claim 1, wherein one portion of said conduit has a smaller diameter than another portion of said conduit.

3. The fluid flow control apparatus according to claim 2, wherein said mixing means comprises a needle valve coupled to the portion of said conduit with smaller diameter, for controlling flow speed of carrier gas therein.

4. The fluid flow control apparatus according to claim 2, further comprising a heater coupled to the portion of said conduit with smaller diameter, for vaporizing the fluid to increase mixing efficiency with the carrier gas.

5. The fluid flow control apparatus according to claim 1, wherein said carrier gas comprises inert gas which does not react with the fluid.

6. The fluid flow control apparatus according to claim 5, wherein said carrier gas comprises nitrogen gas.

7. The fluid flow control apparatus according to claim 1, wherein a diameter of said fluid transmission line is about 0.7 mm.

8. The fluid flow control apparatus according to claim 1, wherein said controlling means comprises a mass flow control (MFC) unit.

9. The fluid flow control apparatus according to claim 8, wherein said mass flow control unit regulates said carrier gas, and then conducts the regulated carrier gas to said conduit.

10. The fluid flow control apparatus according to claim 7, further comprising a candlewick coupled to an inner portion of said fluid transmission line, for increasing a speed of said fluid flowing from the container to the conduit.

11. A fluid flow control apparatus, comprising:

a conduit for conducting carrier gas and fluid, wherein one portion of said conduit has a smaller diameter than other portion of said conduit;

a mass flow control unit for regulating said carrier gas, and then conducting the regulated carrier gas to said conduit;

a container for containing the fluid;

a needle valve coupled to the portion of said conduit with smaller diameter, for controlling a flow speed of carrier gas therein; and a fluid transmission line, one end of said fluid transmission line being connected to said conduit, and the other end of said fluid transmission line being coupled to said container, so that the fluid in the container is transmitted into said conduit to be mixed with the carrier gas.

12. The fluid flow control apparatus according to claim 11, further comprising a heater coupled to the portion of said conduit with smaller diameter, for vaporizing the fluid to increase mixing efficiency with the carrier gas.

13. The fluid flow control apparatus according to claim 11, wherein said carrier gas comprises inert gas which does not react with the fluid.

14. The fluid flow control apparatus according to claim 13, wherein said carrier gas comprises nitrogen gas.

15. The fluid flow control apparatus according to claim 11, wherein a diameter of said fluid transmission line is about 0.7 mm.

16. The fluid flow control apparatus according to claim 11, further comprising a regulating unit, coupled to said container, for regulating pressure in said container.

17. The fluid flow control apparatus according to claim 11, further comprising a candlewick coupled to an inner portion of said fluid transmission line, for increasing a speed of said fluid flowing from the container to the conduit.

18. A fluid flow control apparatus, comprising:

a conduit for conducting carrier gas and fluid;

means for controlling flow of the carrier gas, an input end of said controlling means being configured to receive the carrier gas, and an output end of said controlling means being connected to one end of said conduit;

a container for containing the fluid;

mixing means, coupled to passage of said conduit, for mixing the carrier gas and the fluid;

a fluid transmission line, one end of said fluid transmission line being connected to said conduit, and the other end of said fluid transmission line being coupled to said container, so that the fluid in the container is transmitted into said conduit to be mixed with the carrier gas; and a candlewick coupled to an inner portion of said fluid transmission line, for increasing a speed of said fluid flowing from the container to the conduit.

19. The fluid flow control apparatus according to claim 18, wherein one portion of said conduit has a smaller diameter than another portion of said conduit.

20. The fluid flow control apparatus according to claim 19, wherein said mixing means comprises a needle valve coupled to the portion of said conduit with smaller diameter, for controlling a flow speed of carrier gas therein.

21. The fluid flow control apparatus according to claim 19, further comprising a heater coupled to the portion of said conduit with smaller diameter, for vaporizing the fluid to increase mixing efficiency with the carrier gas.

22. The fluid flow control apparatus according to claim 18, wherein said carrier gas comprises inert gas which does not react with the fluid.

23. The fluid flow control apparatus according to claim 22, wherein said carrier gas comprises nitrogen gas.

24. The fluid flow control apparatus according to claim 18, wherein a diameter of said fluid transmission line is about 0.7 mm.

25. The fluid flow control apparatus according to claim 18, wherein said controlling means comprises a mass flow control (MFC) unit.

26. The fluid flow control apparatus according to claim 25, wherein said mass flow control unit regulates said carrier gas, and then conducts the regulated carrier gas to said conduit.

27. The fluid flow control apparatus according to claim 24, further comprising a regulating unit, coupled to said container, for regulating pressure in said container.

* * * * *